(No Model.)

J. W. CARDER.
HOOK AND BUSHING FOR SAME.

No. 603,373. Patented May 3, 1898.

WITNESSES:
R. E. S. Roy.
William T. Fox

INVENTOR
J. W. Carder.
BY
A. L. Jackson,
ATTORNEY.

United States Patent Office.

JOSHUA W. CARDER, OF FORT WORTH, TEXAS, ASSIGNOR TO SABINA J. CARDER, OF SAME PLACE.

HOOK AND BUSHING FOR SAME.

SPECIFICATION forming part of Letters Patent No. 603,373, dated May 3, 1898.

Application filed January 2, 1897. Serial No. 617,755. (No model.)

*To all whom it may concern:*

Be it known that I, JOSHUA W. CARDER, a citizen of the United States, residing at Fort Worth, in the county of Tarrant and State of Texas, have invented a Hame-Hook and a Bushing for Hame-Hooks, of which the following is a specification.

My invention relates to improvements in hame-hooks and bushings for same; and the object is to prolong the life of the hook indefinitely. This bushing is intended to repair that class of hame-hooks which are used with trace-chains. When trace-chains are manufactured, they are hardened, so that the links will not wear out in the ends or bearings. It is necessary to harden chains because the repairing of chains would be too expensive. Hame-hooks are left annealed, so that they will not wear out the chains, the cost of repairing hame-hooks being less than the cost of repairing chains. Consequently the chain wears the hook out in a short time. The hooks are usually as wide through the bearings as the links of the chain permit; but this does not make the hooks last very long. It costs as much, usually, to repair hame-hooks as to buy new hames. I have provided means by which hooks can be repaired over and over again at very small cost.

Reference is had to the accompanying drawings, forming a part of this specification.

Figure 1:
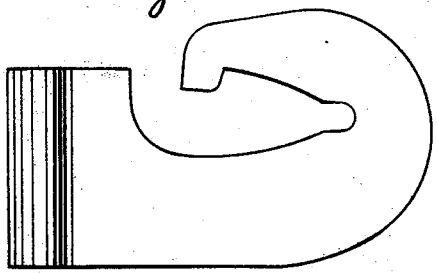
Figure 2:
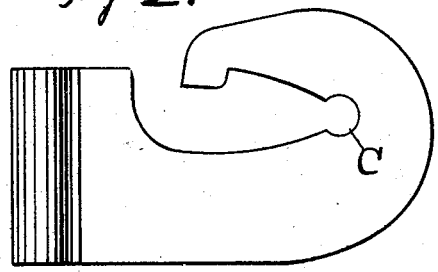
Figure 3:
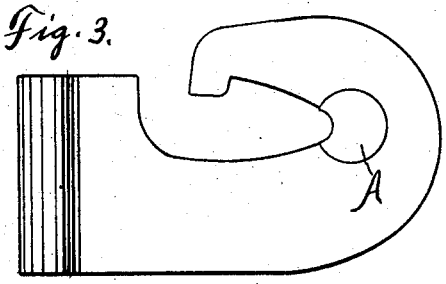
Figure 4:
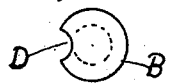
Figure 5:
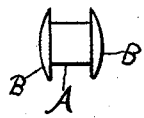
Figure 6:
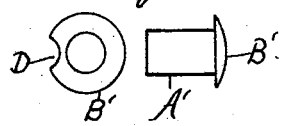
Figure 7:

Figure 1 is a side elevation of a hame-hook, illustrating the hook partly worn. Fig. 2 is a similar view showing the hook ready for the bushing. Fig. 3 is a similar view showing the bushing applied. Fig. 4 is an end view of the bushing. Fig. 5 is a side view of the same. Fig. 6 shows the bushing with one head removed. Fig. 7 is an end view of a bushing having a detachable head, illustrating how bushings are worn.

Similar characters of reference indicate similar parts throughout the several views.

The invention consists of a bushing A, which can be applied to hame-hooks which are partly worn; but I have prepared a hook to which this bushing can be applied. A hook worn as illustrated in Fig. 1 can be prepared to receive the bushing by using a round file and reaming the bearing out till the hook has an eye, as illustrated in Fig. 2.

Fig. 2 illustrates the hook which I have devised for use with the bushing.

For hooks of uniform thickness the bushing can be manufactured in one piece, as illustrated in Figs. 4 and 5. The bushing is attached by forcing it in the eye C in the hook and then clamping the heads B B, if necessary, on the flat faces of the hook. Recesses D are cut in the heads of the bushing to make a bearing for the chain-link.

For hooks of different thicknesses the bushing may be prepared with one head integral therewith and the other head prepared with an aperture to receive the body of the bushing. The bushing can be inserted in the eye and then the head put on and bradded.

Fig. 7 illustrates how the bushing wears. When worn to this condition or stage, a new bushing can be put in. The bushing may be made of annealed wire or of an alloy, such as Babbitt metal, or of any suitable material. It must be about the same degree of softness as the hook and must not be hard enough to wear the chain-links.

To repair hooks with bushings of this kind will cost very little, while to repair hooks in the usual way costs about fifty cents.

Having fully described my invention, what I claim as new, and desire to secure by Letters Patent, is—

1. A bushing for hame-hooks consisting of a solid body portion having heads on both ends thereof, said heads having bearings for chain-links, said bushing being adapted to repair hame-hooks partly worn by the friction of chain-links.

2. The combination of a hook provided with an eye at the bearing-point and the bushing comprising a solid piece of metal which is provided with a head on each end thereof and which is fitted in said eye.

J. W. CARDER.

Witnesses:
R. E. L. ROY,
O. S. LATTIMORE.